(12) United States Patent
Frost

(10) Patent No.: US 7,247,184 B2
(45) Date of Patent: Jul. 24, 2007

(54) ASYMMETRIC HONEYCOMB WALL-FLOW FILTER HAVING IMPROVED STRUCTURAL STRENGTH

(75) Inventor: Rodney I. Frost, Corning, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 10/671,166

(22) Filed: Sep. 25, 2003

(65) Prior Publication Data

US 2005/0066639 A1    Mar. 31, 2005

(51) Int. Cl.
*B01D 46/00*    (2006.01)

(52) U.S. Cl. .................. 55/523; 55/385.3; 55/DIG. 30; 428/116; 60/311

(58) Field of Classification Search .............. 55/385.3, 55/523, DIG. 30; 428/116, 117, 188, 698; 60/311; 502/527.19
See application file for complete search history.

(56) References Cited

U.S. PATENT DOCUMENTS

| | | | |
|---|---|---|---|
| 4,276,071 A | 6/1981 | Outland | |
| 4,329,162 A | 5/1982 | Pitcher, Jr. | 55/523 |
| 4,335,023 A | 6/1982 | Dettling et al. | 252/466 PT |
| 4,364,761 A | 12/1982 | Berg et al. | 55/523 |
| 4,364,781 A | 12/1982 | Vesterlund | 148/63 |
| 4,416,676 A * | 11/1983 | Montierth | 55/523 |
| 4,417,908 A * | 11/1983 | Pitcher, Jr. | 55/523 |
| 4,420,316 A | 12/1983 | Frost et al. | |
| 4,521,532 A | 6/1985 | Cho | |
| 4,643,749 A | 2/1987 | Miura | 55/523 |
| 5,256,054 A | 10/1993 | Cocchetto et al. | |
| 5,714,228 A | 2/1998 | Beckmeyer et al. | 428/118 |
| 5,952,079 A | 9/1999 | Andou et al. | 428/116 |
| 6,159,431 A | 12/2000 | Inoue et al. | 422/180 |
| 6,464,744 B2 | 10/2002 | Cutler et al. | |
| 6,508,852 B1 | 1/2003 | Thompson et al. | |
| 6,570,119 B2 | 5/2003 | Marcher | |
| 6,696,132 B2 * | 2/2004 | Beall et al. | 55/523 |
| 6,803,087 B2 * | 10/2004 | Brew et al. | 55/523 |
| 6,843,822 B2 * | 1/2005 | Beall et al. | 55/523 |

(Continued)

FOREIGN PATENT DOCUMENTS

DE    100 37 403    2/2002

(Continued)

OTHER PUBLICATIONS

Komori et al., "Soot Removal Filter for Diesel Engine", Design Reg. No. 1172155, Apr. 28, 2003.

(Continued)

*Primary Examiner*—Jason M. Greene
(74) *Attorney, Agent, or Firm*—Randall S. Wayland; Anca C. Gheorghiu

(57) ABSTRACT

A honeycomb filter includes an array of interconnecting porous walls which define an array of first channels and second channels. The first channels are bordered on their sides by the second channels and have a larger hydraulic diameter than the second channels. The first channels have a square cross-section, with corners of the first channels having a shape such that the thickness of the porous walls adjoining the corners of the first channels is comparable to the thickness of the porous walls adjoining edges of the first and second channels.

19 Claims, 6 Drawing Sheets

U.S. PATENT DOCUMENTS

| | | | | |
|---|---|---|---|---|
| D505,194 S | * | 5/2005 | Komori et al. | D23/365 |
| D519,197 S | | 4/2006 | Komori et al. | D23/365 |
| D522,117 S | | 5/2006 | Komori et al. | D23/365 |
| 2005/0016140 A1 | * | 1/2005 | Komori et al. | 55/523 |
| 2005/0016141 A1 | * | 1/2005 | Hong et al. | 55/523 |
| 2005/0066639 A1 | | 3/2005 | Frost | 55/523 |
| 2005/0076627 A1 | | 4/2005 | Itou et al. | 55/523 |
| 2005/0166562 A1 | | 8/2005 | Beall et al. | 55/523 |
| 2005/0191461 A1 | | 9/2005 | Kasai et al. | 428/116 |
| 2005/0274097 A1 | | 12/2005 | Beall et al. | 55/523 |

FOREIGN PATENT DOCUMENTS

| | | | |
|---|---|---|---|
| EP | 1 495 791 | | 1/2005 |
| EP | 1 502 639 | | 2/2005 |
| EP | 1 568 406 | | 8/2005 |
| FR | 2 789 327 | | 8/2000 |
| FR | S 789 327 | | 8/2000 |
| JP | D1172155 | * | 4/2003 |

OTHER PUBLICATIONS

Komori et al., "Soot Removal Filter for Diesel Engine", Design Reg. No. 1189138, Nov. 5, 2003.

Komori et al., "Soot Removal Filter for Diesel Engine", Design Reg. No. 1189139, Nov. 5, 2003.

Komori et al., "Soot Removal Filter for Diesel Engine", Design Reg. No. 1189428, Nov. 5, 2003.

* cited by examiner

ASYMMETRIC HONEYCOMB WALL-FLOW FILTER HAVING IMPROVED STRUCTURAL STRENGTH

BACKGROUND OF INVENTION

Honeycomb wall-flow filters are used to remove carbonaceous soot from exhaust of diesel engines. FIG. 1A shows a conventional honeycomb wall-flow filter 100 having an inlet end 102, an outlet end 104, and an array of interconnecting porous walls 106 extending longitudinally from the inlet end 102 to the outlet end 104. The interconnecting porous walls 106 define a grid of inlet channels 108 and outlet channels 110. At the inlet end 102, the outlet channels 110 are end-plugged with filler material 112 while inlet channels 108 are not end-plugged. Although not visible from the figure, at the outlet end 104, the inlet channels 108 are end-plugged with filler material while the outlet channels 110 are not end-plugged. Each inlet channel 108 is bordered on all sides by outlet channels 110 and vice versa. FIG. 1B shows a close-up view of the cell structure used in the honeycomb filter. The porous walls 106 defining the inlet and outlet channels (or cells) 108, 110 are straight, and the inlet and outlet cells 108, 110 have a square cross-section and equal hydraulic diameter.

Returning to FIG. 1A, diesel exhaust flows into the honeycomb filter 100 through the unplugged ends of the inlet channels 108 and exits the honeycomb filter through the unplugged ends of the outlet channels 110. Inside the honeycomb filter 100, the diesel exhaust is forced from the inlet channels 108 into the outlet channels 110 through the porous walls 106. As diesel exhaust flows through the honeycomb filter 100, soot and ash particles accumulate on the porous walls 106, decreasing the effective flow area of the inlet channels 108. The decreased effective flow area creates a pressure drop across the honeycomb filter, which leads to a gradual rise in back pressure against the diesel engine. When the pressure drop becomes unacceptable, thermal regeneration is used to remove the soot particles trapped in the honeycomb filter. The ash particles, which include metal oxide impurities, additives from lubrication oils, sulfates and the like, are not combustible and cannot be removed by thermal regeneration. During thermal regeneration, excessive temperature spikes can occur, which can thermally shock, crack, or even melt, the honeycomb filter.

It is desirable that the honeycomb filter has sufficient structural strength to withstand thermal regeneration. To avoid the need for frequent thermal regeneration, it is also desirable that the honeycomb filter has a high capacity for storing soot and ash particles. For a cell structure in which the inlet and outlet channels have equal hydraulic diameter, the effective flow area of the inlet channels can easily become much smaller than that of the outlet channels, creating a large pressure drop across the honeycomb filter. One solution that has been proposed to reducing this pressure drop involves making the hydraulic diameter (or effective cross-sectional flow area) of the inlet channels larger than that of the outlet channels. In this way, as soot and ash particles accumulate on the inlet portion of the porous walls, the effective flow area of the inlet channels will tend to equalize with that of the outlet channels.

For the conventional honeycomb cell structure shown in FIG. 1B, the hydraulic diameter of the inlet cells 108 can be made larger than the outlet cells 110 by reducing the hydraulic diameter of the outlet cells 110. FIG. 1C shows the honeycomb cell structure of FIG. 1B after reducing the hydraulic diameter of the outlet cell 110 such that the outlet cell 110 now has a smaller hydraulic diameter in comparison to the inlet cell 108. Another modification that can be made is to increase the hydraulic diameter of the inlet cells 108. This modification has the advantage of increasing the effective surface area available for collecting soot and ash particles in the inlet portion of the honeycomb filter, which ultimately increases the overall storage capacity of the honeycomb filter. FIG. 1D shows the honeycomb cell structure of FIG. 1C after increasing the hydraulic diameter of the inlet cell 108. Without changing the cell density of the honeycomb filter, any increase in the hydraulic diameter of the inlet cell 108 would produce a corresponding decrease in the thickness of the wall between the adjacent corners of inlet cells 108 (compare $t_2$ in FIG. 1D with $t_1$ in FIG. 1C). As the wall between the corners of the inlet cells become thinner, the structural strength of the honeycomb filter decreases, making the honeycomb filter more susceptible to thermal shock and cracking during thermal regeneration.

From the foregoing, there is desired a method of improving the storage capacity of the honeycomb filter while maintaining good flow rates through the honeycomb filter without significantly reducing the structural strength of the honeycomb filter.

SUMMARY OF INVENTION

In one aspect, the invention relates to a honeycomb filter which comprises an array of interconnecting porous walls that define an array of first channels and second channels. The first channels are bordered on their sides by the second channels and have a larger hydraulic diameter than the second channels. The first channels have a square cross-section, with corners of the first channels having a shape such that the thickness of the porous walls adjoining corners of the first channels is comparable to the thickness of the porous walls adjoining edges of the first and the second channels.

In another aspect, the invention relates to a honeycomb filter which comprises an array of interconnecting porous walls that define an array of first channels having a square cross-section and second channels having a square cross-section. The first channels are bordered on their edges by the second channels. The edges of the first channels are aligned with edges of the bordering second channels. The first channels have a larger hydraulic diameter than the second channels.

In yet another aspect, the invention relates to an extrusion die assembly for making a honeycomb filter which comprises a cell forming die having a central region and a peripheral region. The central region comprises an array of discharge slots cut to define an array of first and second pins and an array of first feedholes in communication with the array of discharge slots. The peripheral region comprises at least a second feedhole. The first pins have a larger cross-sectional area than the second pins. The cross-sectional shape of the first pins is selected such that the width of the discharge slots is substantially uniform. The extrusion die assembly also includes a skin forming mask mounted coaxially with the cell forming die and radially spaced from the cell forming die so as to define a skin slot that is in selective communication with the at least second feedhole.

Other features and advantages of the invention will be apparent from the following description and the appended claims.

DETAILED DESCRIPTION OF PREFERRED EMBODIMENTS

The invention will now be described in detail with reference to a few preferred embodiments, as illustrated in the accompanying drawings. In the following description, numerous specific details are set forth in order to provide a thorough understanding of the invention. It will be apparent, however, to one skilled in the art that the invention may be practiced without some or all of these specific details. In other instances, well-known features and/or process steps have not been described in detail in order to not unnecessarily obscure the invention. The features and advantages of the invention may be better understood with reference to the drawings and discussions that follow.

Figure 2A:
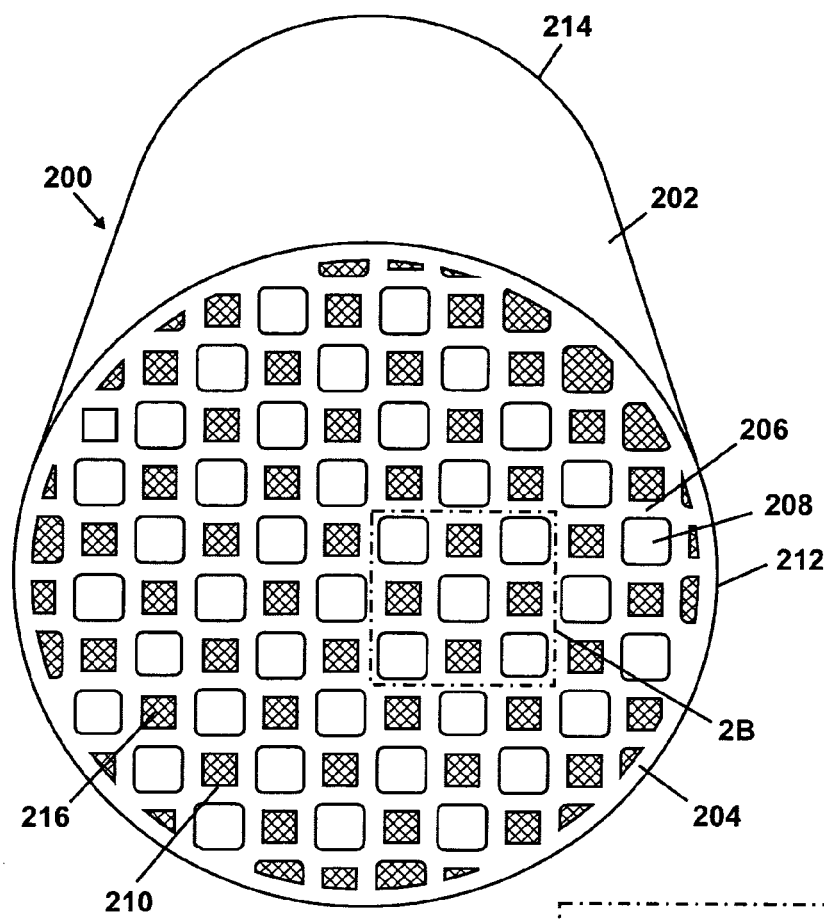
FIG. 2A is a perspective view of a honeycomb wall-flow filter according to an embodiment of the invention.

For illustration purposes, FIG. 2A shows a honeycomb wall-flow filter 200 according to an embodiment of the invention. The honeycomb filter 200 has a columnar body 202 whose cross-sectional shape is defined by a skin (or peripheral wall) 204. The profile of the skin 204 is typically circular or elliptical, but the invention is not limited to any particular skin profile. The columnar body 202 has an array of interconnecting porous walls 206, which intersect with the skin 204. The porous walls 206 define a grid of inlet channels 208 and outlet channels 210 in the columnar body 202. The inlet and outlet channels 208, 210 extend longitudinally along the length of the columnar body 202. Typically, the columnar body 202 is made by extrusion. Typically, the columnar body 202 is made of a ceramic material, such as cordierite or silicon carbide, but could also be made of other extrudable materials, such as glass, glass-ceramics, plastic, and metal.

The honeycomb filter 200 has an inlet end 212 for receiving flow, e.g., exhaust gas flow, and an outlet end 214 through which filtered flow can exit the honeycomb filter. At the inlet end 212, end portions of the outlet channels 210 are plugged with filler material 216 while the end portions of the inlet channels 208 are not. Typically, the filler material 216 is made of a ceramic material, such as cordierite or silicon carbide. Although not visible from the figure, at the outlet end 214, end portions of inlet channels 208 are plugged with filler material while the end portions of the outlet channels 210 are not plugged. Partial cells near the periphery of the skin 204 are typically plugged with filler material. Inside the honeycomb filter 200, the interconnected porous walls 206 allow flow from the inlet channels 208 into the outlet channels 210. The porosity of the porous walls 206 can be variable. In general, the porosity should be such that the structural integrity of the honeycomb filter is not compromised. For diesel filtration, the porous walls 206 may incorporate pores having mean diameters in the range of 1 to 60 µm, more preferably in a range from 10 to 50 µm.

Figure 2B:
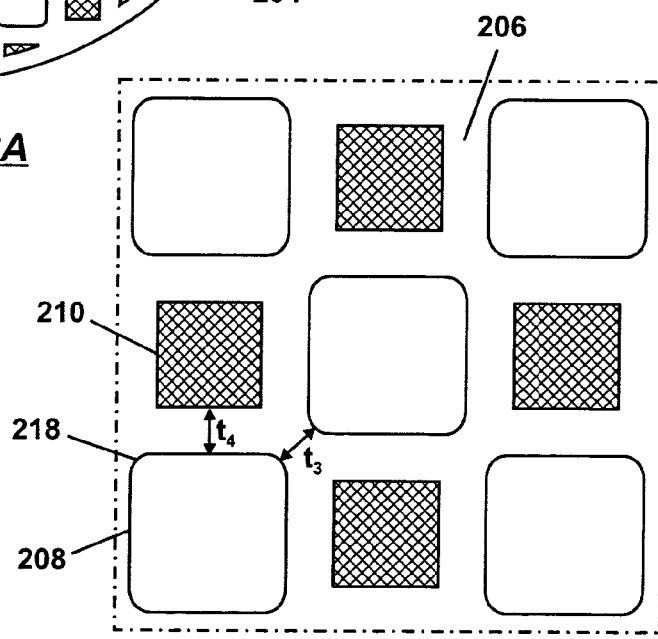
FIG. 2B shows a honeycomb cell structure having inlet cells and outlet cells with unequal hydraulic diameters and the inlet cells with filleted corners according to one embodiment of the invention.

FIG. 2B shows a close-up view of the cell structure of the honeycomb filter 200. Each inlet cell 208 is bordered by outlet cells 210 and vice versa. To maintain good flow rates when the honeycomb filter 200 is in use, the inlet cells 208 are made to have a larger hydraulic diameter than the outlet cells 210. In the illustration, the outlet cells 210 have a square geometry. In the illustration, the inlet cells 208 also have a square geometry, but the corners of the square include fillets 218. One purpose of the fillets 218 is to make the thickness ($t_3$) between the adjacent corners of the inlet cells 208 comparable to the thickness ($t_4$) between the inlet cells 208 and the outlet cells 210. In one embodiment, the thickness $t_3$ is in a range of about 0.8 to 1.2 times the thickness $t_4$. Preferably, the radius of the fillets 218 is selected such that the thickness of the porous walls is substantially uniform around the cells. The radius of the fillets 218 may also be selected such that hydraulic diameter of the inlet cells 208 is maximized for a selected cell density and closed frontal area.

Figure 1A:
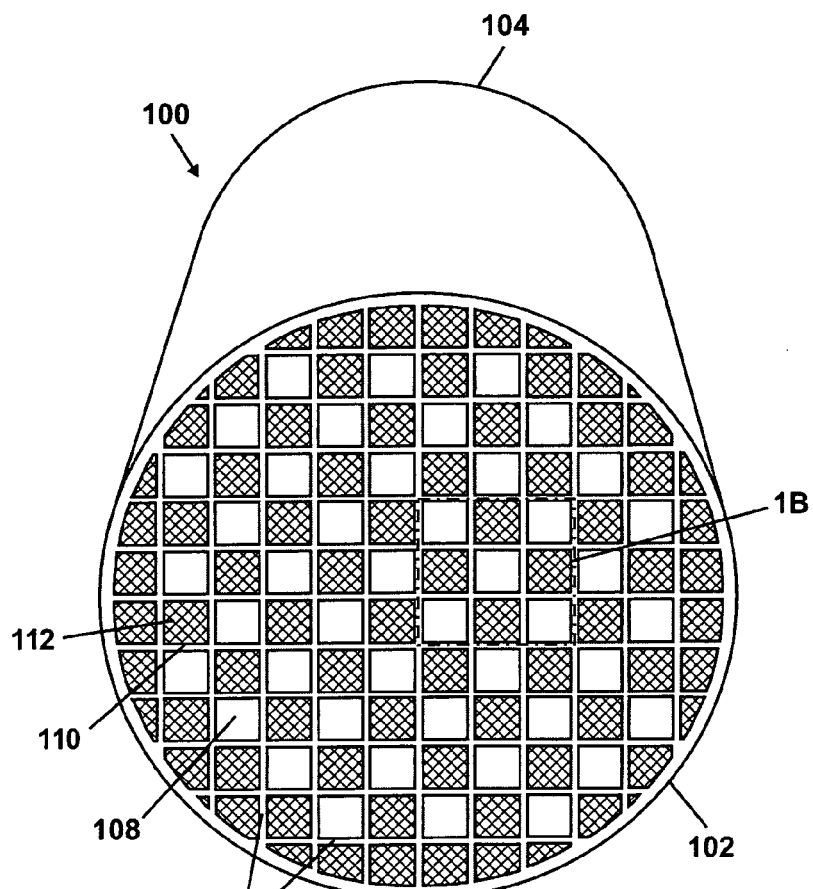
FIG. 1A is a perspective view of a prior-art honeycomb wall-flow filter.
Figure 1B:
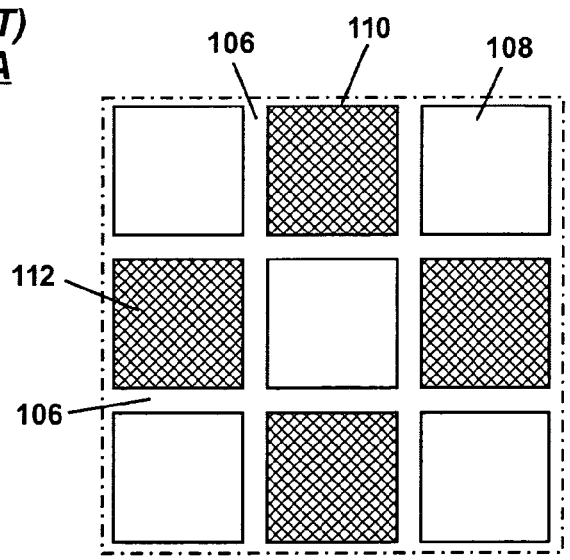
FIG. 1B shows a standard honeycomb cell structure having inlet and outlet cells with equal hydraulic diameter.
Figure 1C:
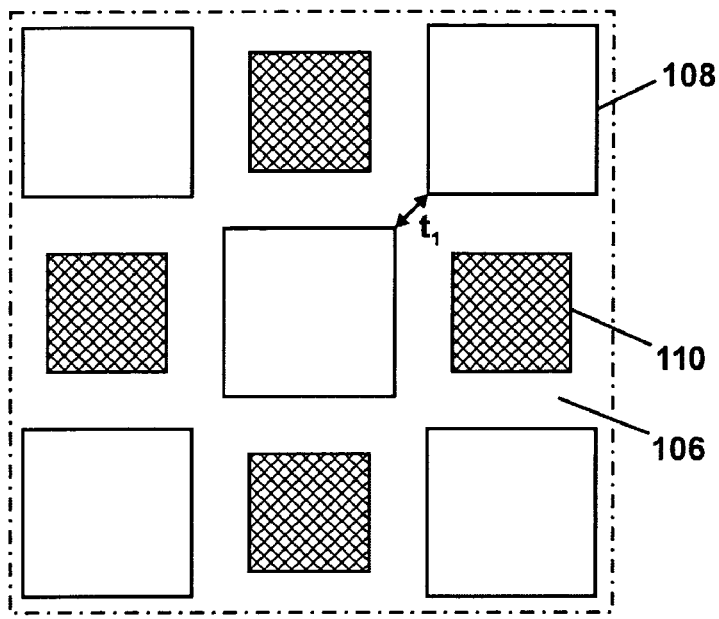
FIG. 1C shows the honeycomb cell structure of FIG. 1B after reducing the hydraulic diameter of the outlet cells.
Figure 1D:
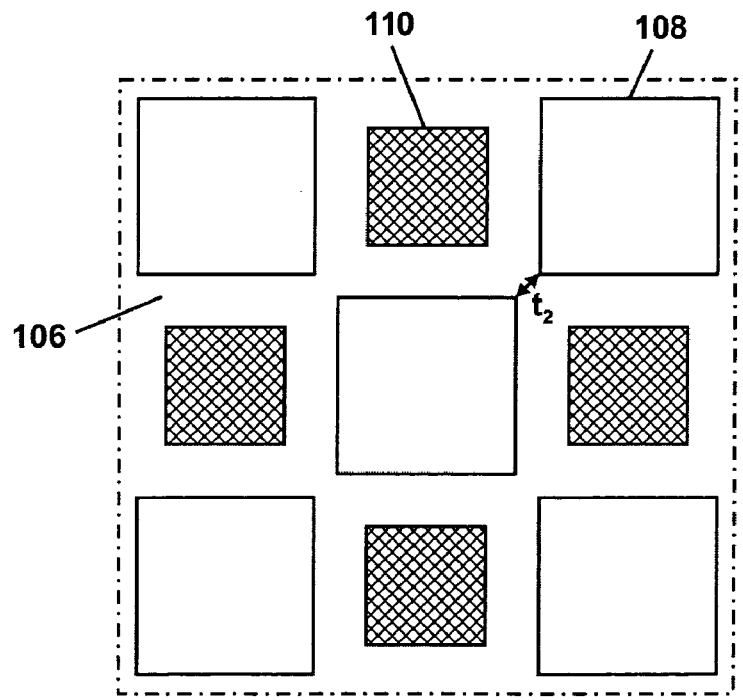
FIG. 1D shows the honeycomb cell structure of FIG. 1C after increasing the hydraulic diameter of the inlet cells.

Table 1 below shows examples of cell structures having a cell density of 200 cells/in$^2$ (about 31 cells/cm$^2$) and a closed frontal area of 47%. Cell structures A and B are specific examples of the inventive cell structure shown in FIG. 2B. Cell structures C and D are specific examples of the prior-art cell structure shown in FIG. 1C.

TABLE 1

| Cell Structure | Inlet cell hydraulic diameter (mm) | Ratio inlet cell hydraulic diameter to outlet cell hydraulic diameter | Inlet cell width (mm) | Outlet cell width (mm) | Fillet radius (mm) | Thickness between adjacent corners of inlet cells (mm) |
|---|---|---|---|---|---|---|
| A | 1.68 | 1.7 | 1.59 | 0.98 | 0.30 | 0.54 |
| B | 1.73 | 2.0 | 1.64 | 0.88 | 0.30 | 0.47 |
| C | 1.59 | 1.7 | 1.59 | 0.93 | None | 0.28 |
| D | 1.64 | 2.0 | 1.64 | 0.83 | None | 0.22 |

Hydraulic diameter, $D_H$, of a cell is defined as follows:

$$D_H = \frac{4A}{P} \quad (1)$$

where A is the cross-sectional area of the cell and P is the wetted perimeter of the cell. For a square cell, the hydraulic diameter is the width of the cell. For a square cell with filleted corners, the hydraulic diameter is larger than the width of the cell.

Figure 2C:
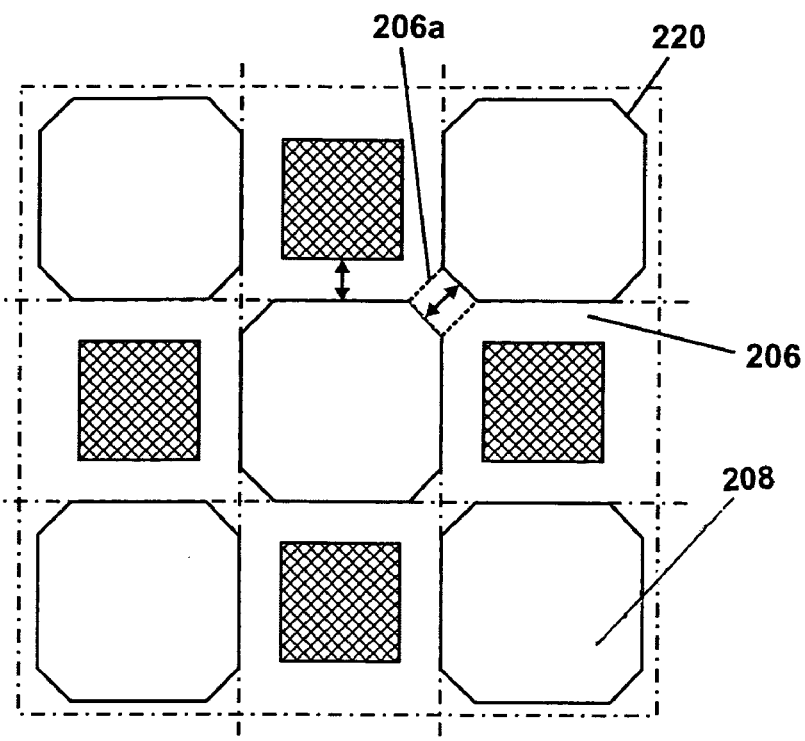
FIG. 2C shows a honeycomb cell structure having inlet cells and outlet cells with unequal hydraulic diameters and the inlet cells with beveled corners according to another embodiment of the invention.

From Table 1 above, the hydraulic diameters of the inlet cells of the inventive cell structures A and B are larger than the hydraulic diameters of the inlet cells of the prior-art cell structures C and D, respectively. The larger hydraulic diameters of the cell structures A and B are achieved while maintaining the same cell density and closed frontal area as that of the prior-art cell structures C and D. FIG. 2E shows how hydraulic diameter varies as a function of fillet radius for a given cell width. The position of the cell structures A, B, C, and D are indicated on the graph. The graph shows that hydraulic diameter has a non-linear relationship with fillet radius. In practice, the inlet cells can be made to have the fillet radius corresponding to the maximum hydraulic diameter achievable for a selected cell width.

Returning to FIG. 2B, the present invention is not limited to inclusion of fillets 218 at the corners of the inlet cells 208. The corners of the inlet cells 208 could be beveled, for example. FIG. 2C shows a cell structure where the corners of the inlet cells 208 include bevels 220. In this embodiment, the inlet cells 208 have also been enlarged such that the edges of (diagonally) adjacent inlet cells 208 are substantially aligned. This increases the overall storage capacity of the honeycomb filter while allowing good flow rates through the honeycomb filter to be maintained. The bevels 220 (or fillets if used instead of bevels) enable uniformly thick porous walls 206 to be provided around the cells. For the cell structures shown in FIGS. 2B and 2C, and particularly in FIG. 2C, the porous walls 206 are not straight. This leads to an increase in the thermal shock resistance of the honeycomb structure. In the design shown in FIG. 2C, portions of the porous walls, e.g., porous wall 206a, are common to only the inlet cells 208. These porous wall portions that are common to only the inlet cells 208 could facilitate transfer of heat from one inlet cell to another during thermal regeneration.

The fillets and bevels can be used to achieve a substantially uniform porous wall thickness throughout the honeycomb filter while maintaining a desired closed frontal area, cell density, and ratio of hydraulic diameter of inlet cell to outlet cell. Typically, a ratio of hydraulic diameter of inlet cell to outlet cell in a range from 1.1 to 2.0, preferably 1.3 to 2.0, more preferably 1.7 to 2.0, is desired. For diesel particulate filtration, a honeycomb having cell density in a range from 10 to 300 cells/in$^2$ (about 1.5 to 46.5 cells/cm$^2$), more typically in a range from 100 to 200 cells/in$^2$ (about 15.5 to 31 cells/cm$^2$), is considered useful to provide sufficient thin wall surface area in a compact structure. The thickness of the interconnecting porous walls can vary upwards from the minimum dimension of about 0.002 in. (0.05 mm) providing structural integrity, but is generally less than about 0.060 in (1.5 mm) to minimize filter volume. A porous wall thickness in a range of about 0.010 to 0.030 in. (about 0.25 to 0.76 mm), preferably in a range from about 0.010 to 0.025 in. (about 0.25 to 0.64 mm), is most often selected at the preferred cell densities.

Figure 2D:
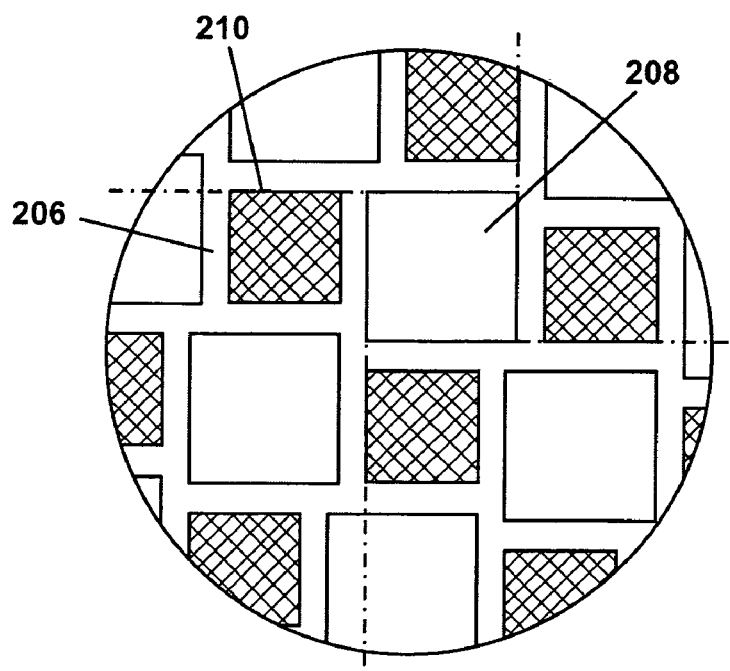
FIG. 2D shows a honeycomb cell structure having inlet and outlet cells with unequal hydraulic diameters and aligned edges according to another embodiment of the invention.
Figure 2E:
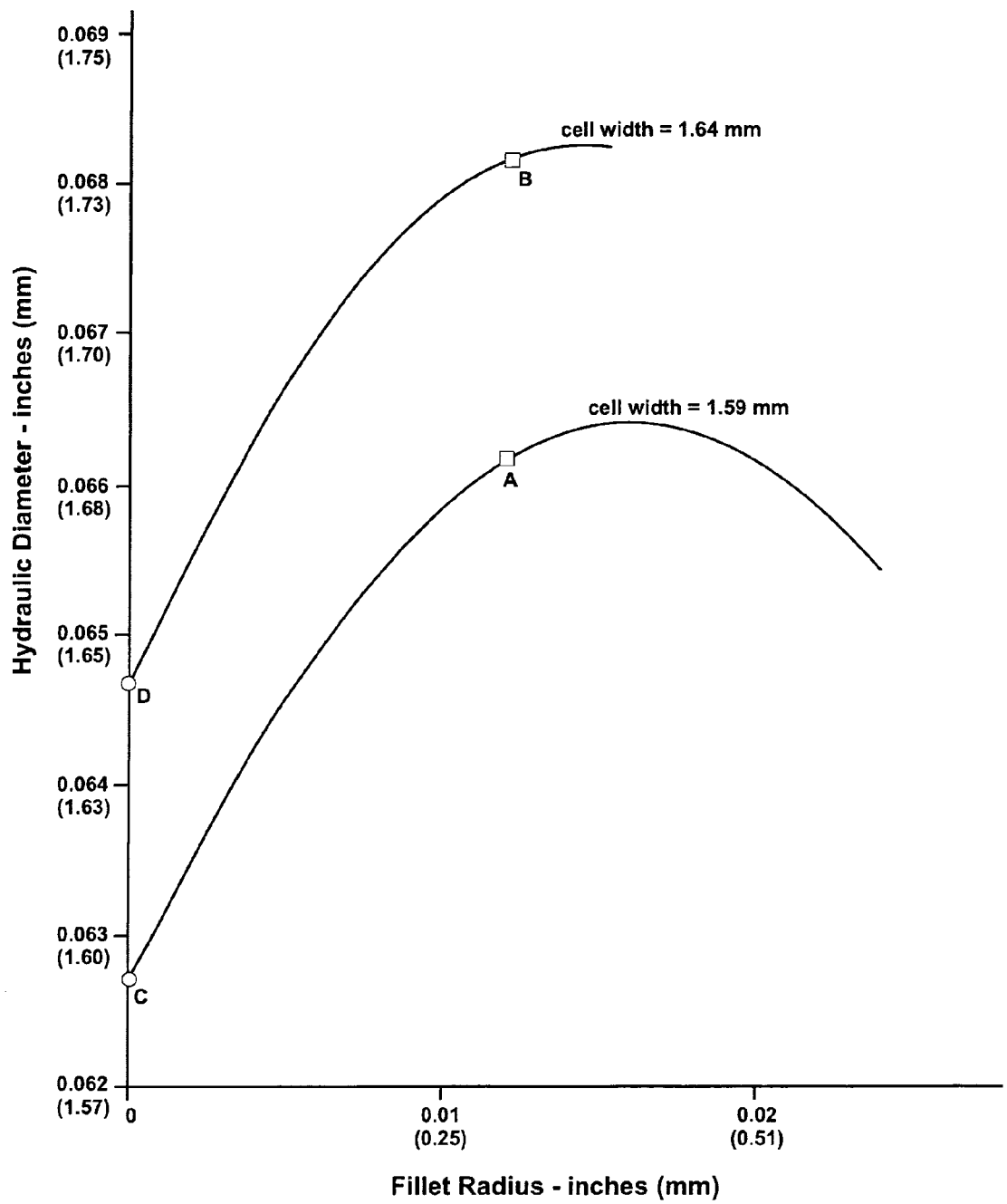
FIG. 2E is a graph of hydraulic diameter of a cell as a function of fillet radius and cell width.

FIG. 2D shows another cell structure where the edges of the inlet cells 208 are aligned with edges of the outlet cells 210 and the thickness of the porous walls 206 is uniform throughout the honeycomb filter without the use of a bevel or fillet at the corners of the inlet cells 208. However, a fillet or bevel to the corners of the inlet cells 208 can further improve the structural strength of the honeycomb filter. The porous walls 206 in this embodiment are even less straight than the porous walls in the embodiments previously described, leading to further improvement in thermal shock resistance.

Figure 3:
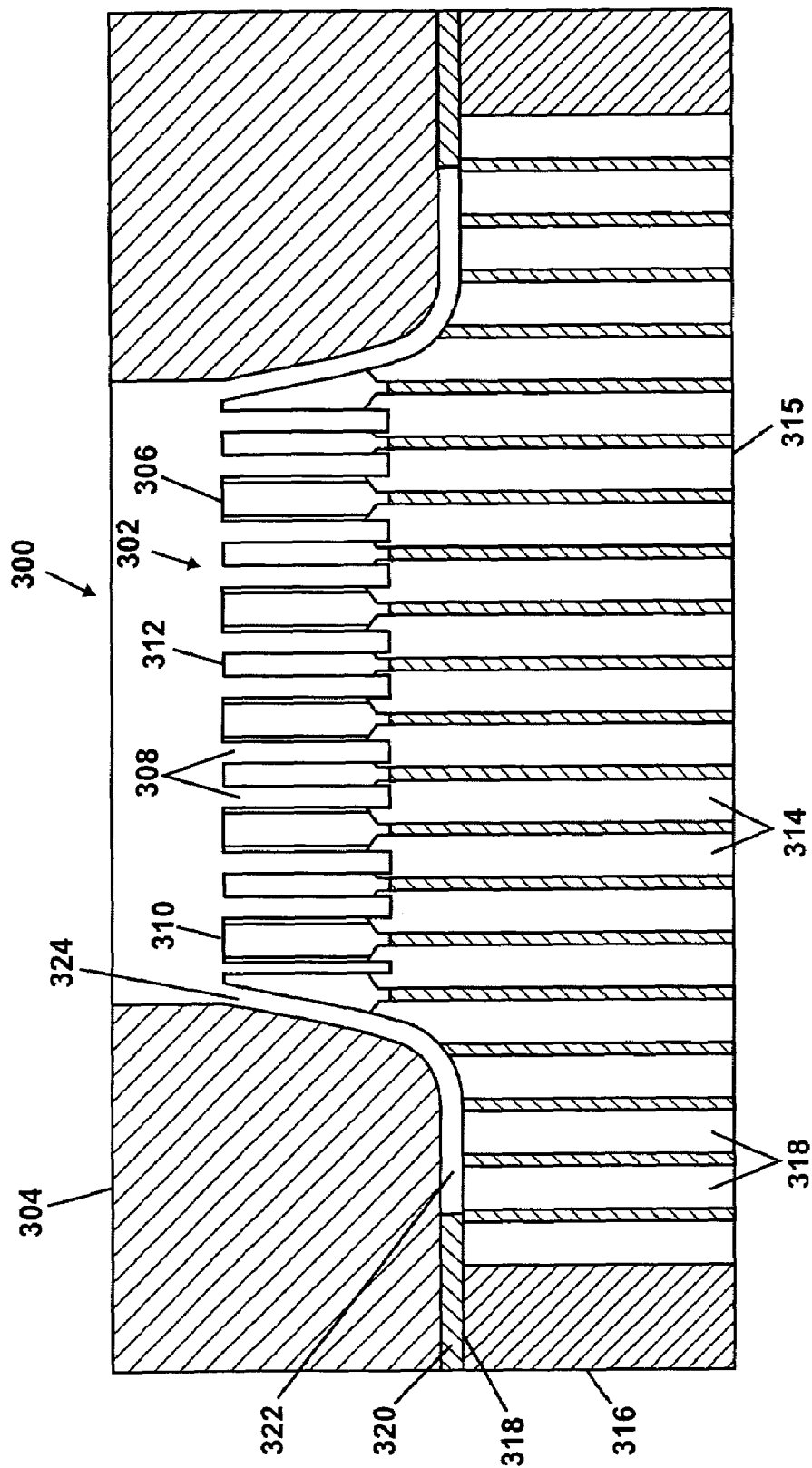
FIG. 3 is a cross-section of an extrusion die assembly according to one embodiment of the invention.

Honeycomb extrusion dies suitable for the manufacture of the honeycomb filter described above would have pin arrays including pins of alternating size. The corners of alternating pins could be rounded or beveled. For illustration purposes, FIG. 3 shows a vertical cross-section of an extrusion die assembly 300. The extrusion die assembly 300 includes a cell forming die 302 and a skin forming mask 304. The cell forming die 300 is used to form the interconnecting porous walls that define the inlet and outlet cells of the honeycomb filter. The cell forming die 302 cooperate with the skin forming mask 304 to define the shape and thickness of the skin of the honeycomb filter. The cell forming die 302 has a central region 306. An array of discharge slots 308 is cut in the central region 306 to define an array of inlet and outlet pins 310, 312. In one embodiment, the transverse cross-section of the inlet and outlet pins 310, 312 is square, with each corner of the inlet pins 310 including a fillet or bevel.

The central region 306 of the cell forming die 302 further includes an array of central feedholes 314, which extend from the inlet face 315 of the die to the array of discharge slots 308. The central feedholes 314 supply batch material to the discharge slots 308. The size and location of the central feedholes 314 relative to the discharge slots 308 are selected to achieve a desired flow rate through the discharge slots 308. As an example, a central feedhole 308 may correspond to each or every other discharge slot 308 or may correspond to each or every other intersection of the discharge slots 308.

The cell forming die 302 also includes a peripheral region 316 formed contiguous with the central region 306. The peripheral region 316 provides a mounting surface 318 for the skin forming mask 304 and includes feedholes 318 for feeding batch material to spaces around the cell forming die 302. In one embodiment, a shim 320 is interposed between the mounting surface 318 and the skin forming mask 304 to define a skin forming reservoir 322 between the peripheral region 316 and the skin forming mask 304. The feedholes 318 in the peripheral region 316 supply batch material to the skin forming reservoir 322. The skin forming mask 304 is radially spaced from the central region 306 to define a skin slot 324, which is in communication with the skin forming reservoir 322. Batch material is extruded through the skin slot 324 to form the skin of the honeycomb filter. The volume of the reservoir 322 can be adjusted to control the rate at which batch material is supplied into the skin slot 324.

In operation, batch material is fed into the feedholes 314, 318 in the cell forming die 302 and extruded through the discharge slots 308 and the skin forming slot 324. The volume of the batch material in the skin forming reservoir 322 is dependent on the extent of the radial overhang of the skin forming mask 304 over the skin forming reservoir 322. The rate of flow of batch material into the skin forming slot determines the character of the skin, while the rate of flow of batch material into the discharge slots determine the character of the porous walls.

The extrusion die assembly described above can be manufactured using existing methods for making extrusion dies. The cell forming die may be made by machining holes in a lower portion of a block that is made of a machinable material. These holes would serve as feedholes. A process such as plunge electrical discharge machining can be used to cut the discharge slots in the upper portion of the block. Pins remain on the upper portion of the block after the slots are cut. The pins at the periphery of the block can be shortened or completely removed to provide a mounting surface for the skin forming mask. The discharge slots could have any of the geometries described above in conjunction with the cell structure of the honeycomb filter.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A honeycomb filter, comprising:
an array of interconnecting porous walls which define an array of first channels and second channels, the first channels being bordered on their sides by the second channels and having a larger hydraulic diameter than the second channels, the first channels having a square cross-section, with corners of the first channels having a shape such that the thickness of the porous walls adjoining corners of the first channels is in a range of 0.8 to 1.2 times the thickness of the porous walls adjoining edges of the first and the second channels wherein a ratio of the hydraulic diameter of the first channels to the hydraulic diameter of the second channels is in a range from 1.1 to 2.0.

2. The honeycomb filter of claim 1, wherein the shape includes a fillet.

3. The honeycomb filter of claim 1, wherein the shape includes a bevel.

4. The honeycomb filter of claim 1, wherein edges of diagonally-adjacent first channels are substantially aligned.

5. The honeycomb filter of claim 1, wherein the second channels have a square cross-section.

6. A honeycomb filter, comprising:
an array of interconnecting porous walls which define an array of first channels and second channels, the first channels being bordered on their sides by the second channels and having a larger hydraulic diameter than the second channels, the first channels having a square cross-section, with corners of the first channels having a shape such that the thickness of the porous walls adjoining corners of the first channels is comparable to the thickness of the porous walls adjoining edges of the first and the second channels, wherein a ratio of the hydraulic diameter of the first channels to the hydraulic diameter of the second channels is in a range from 1.7 to 2.0.

7. The honeycomb filter of claim 1, wherein the first channels are end-plugged at a first end of the honeycomb filter and the second channels are end-plugged at a second end of the honeycomb filter so that flow into the first channels pass through the porous walls and then out of the honeycomb filter through the second channels.

8. A honeycomb filter, comprising:
an array of interconnecting porous walls which define an array of first channels having a square cross-section and second channels having a square cross-section, the first channels bordered on their edges by the second channels, the edges of the first channels being aligned with edges of the bordering second channels, the first channels having a larger hydraulic diameter than the second channels.

9. The honeycomb filter of claim 8, wherein the first channels are positioned relative to the second channels such that the porous walls have a substantially uniform thickness.

10. The honeycomb filter of claim 8, wherein corners of the first channels include fillets.

11. The honeycomb filter of claim 8, wherein corners of the first channels include bevels.

12. The honeycomb filter of claim 8, wherein a ratio of the hydraulic diameter of the first channels to the hydraulic diameter of the second channels is in a range from 1.1 to 2.0.

13. The honeycomb filter of claim 12, wherein a ratio of the hydraulic diameter of the first channels to the hydraulic diameter of the second channels is in a range from 1.7 to 2.0.

14. The honeycomb filter of claim 8, wherein the first channels are end-plugged at a first end of the honeycomb filter and the second channels are end-plugged at a second end of the honeycomb filter so that flow into the first channels pass through the porous walls and then out of the honeycomb filter through the second channels.

15. A honeycomb filter, comprising:
an array of interconnecting porous walls which define an array of first channels and second channels, the first channels being bordered on their sides by the second channels and having a larger hydraulic diameter than the second channels, the first and second channels having a square cross-section, with corners of the first channels having a shape including a fillet or a bevel- such that the thickness of the porous walls adjoining corners of the first channels is in a range of 0.8 to 1.2 times the thickness of the porous walls adjoining edges of the first and the second channels and wherein a ratio of the hydraulic diameter of the first channels to the hydraulic diameter of the second channels is in a range from 1.1 to 2.0.

16. A honeycomb filter, comprising:
an array of interconnecting porous walls which define an array of first channels and second channels, the first channels being bordered on their sides by the second channels and having a larger hydraulic diameter than the second channels, the first channels having a square cross-section, with corners of the first channels having a shape including a fillet such that the thickness of the porous walls adjoining corners of the first channels is in a range of 0.8 to 1.2 times the thickness of the porous walls adjoining edges of the first and the second channels.

17. The honeycomb filter of claim 1, wherein the honeycomb is a non-segmented columnar body having an outer profile which is circular or elliptical.

18. The honeycomb filter of claim 17, wherein the honeycomb wherein the outer profile is defined by a skin.

19. The honeycomb filter of claim 6, wherein the thickness of the porous walls adjoining the corners is in a range of 0.8 to 1.2 times the thickness of the porous walls adjoining edges of the first and the second channels.

* * * * *